(12) United States Patent
Ingebretsen et al.

(10) Patent No.: US 7,503,727 B2
(45) Date of Patent: Mar. 17, 2009

(54) PIPELINE TERMINATION SKID, A CONNECTION ARRANGEMENT COMPRISING SUCH A PIPELINE TERMINATION SKID AND A PIPELINE TERMINATION

(75) Inventors: Helge Ingebretsen, Svelvik (NO); Rolf Bastesen, Nesoddtangen (NO)

(73) Assignee: Vetco Gray Scandinavia AS, Sandvika (NO)

( * ) Notice: Subject to any disclaimer, the term of this patent is extended or adjusted under 35 U.S.C. 154(b) by 181 days.

(21) Appl. No.: 11/630,770

(22) PCT Filed: Jun. 16, 2005

(86) PCT No.: PCT/IB2005/001685

§ 371 (c)(1),
(2), (4) Date: Dec. 27, 2006

(87) PCT Pub. No.: WO2006/005994

PCT Pub. Date: Jan. 19, 2006

(65) Prior Publication Data

US 2007/0269270 A1 Nov. 22, 2007

(30) Foreign Application Priority Data

Jun. 30, 2004 (NO) .................................. 20042765

(51) Int. Cl.
*F16L 1/26* (2006.01)
(52) U.S. Cl. ........................................................ 405/169
(58) Field of Classification Search .................. 405/158, 405/169, 170
See application file for complete search history.

(56) References Cited

U.S. PATENT DOCUMENTS

| 4,019,334 A | 4/1977 | Sinclair et al. |
| 5,730,551 A | 3/1998 | Skeels et al. |
| 6,142,708 A * | 11/2000 | Tarlton et al. ............... 405/170 |

FOREIGN PATENT DOCUMENTS

NO 304954 B1 3/1999

OTHER PUBLICATIONS

PCT/ISA/210—International Search Report.
PCT/ISA/237—Written Opinion of the International Searching Authority.
Norwegian Search Report.

* cited by examiner

Primary Examiner—John Kreck
(74) Attorney, Agent, or Firm—Venable LLP; Eric J. Franklin

(57) ABSTRACT

A pipeline termination skid to be mounted to a pipeline end section to support a pipeline hub during the connection of the pipeline hub to a corresponding spool piece hub. The pipeline termination skid is so designed that a pipeline end section may be mounted thereto subsea by lowering the pipeline end section into a seat of one or several holding devices of the pipeline termination skid and thereafter displacing the pipeline termination skid along the pipeline end section so that the respective seat is brought into engagement with an alignment element secured about the pipeline end section so as to thereby fix the pipeline end section axially and radially in relation to the pipeline termination skid. A connection arrangement includes the pipeline termination skid, a pipeline termination designed for co-operation with the termination skid and a method for subsea connection of a pipeline to a spool piece.

28 Claims, 10 Drawing Sheets

US 7,503,727 B2

PIPELINE TERMINATION SKID, A CONNECTION ARRANGEMENT COMPRISING SUCH A PIPELINE TERMINATION SKID AND A PIPELINE TERMINATION

CROSS-REFERENCE TO RELATED APPLICATIONS

This application claims priority to Norwegian patent application 20042765 filed Jun. 30, 2004 and is the national phase under 35 U.S.C. § 371 of PCT/IB2005/001685 filed Jun. 16, 2005.

FIELD OF THE INVENTION AND PRIOR ART

The present invention relates to pipeline termination skid and a connection arrangement comprising such a pipeline termination skid for subsea connection of a pipeline to a spool piece. The invention also relates to a method for subsea connection of a pipeline to a spool piece. The invention also relates to a pipeline termination.

Development within offshore oil and gas exploration in the recent years has been directed to subsea installations for processing and transport of oil and gas. These subsea installations replace the traditional platforms, where oil and gas was transported up to the platform for further processing and transport. This development of subsea production, processing and transport systems has resulted in an increasing need for subsea connection arrangements for coupling together a longer pipeline installed on the seabed and a so-called spool piece without requiring any assistance of divers. A spool piece is used for connecting a pipeline termination to a pipe termination of a subsea installation, such as e.g. a subsea production or injection well. The spool piece is designed to span between the end points of the pipeline termination and said pipe termination in order to complete a connection between the pipeline and said pipe. The spool piece is provided with a spool piece hub which is to mate with a corresponding pipeline hub arranged at the pipeline termination.

A pipeline connection arrangement and method for subsea connection of a pipeline to a spool piece is previously known from U.S. Pat. No. 4,019,334 A. The spool piece hub is here attached to a foundation arranged on the seabed. The pipeline hub is secured to a trunnion assembly and is installed on the subsea foundation by being lowered together with the trunnion assembly downwards from a surface vessel guided by a guide cable. After the pipeline hub and the trunnion assembly have been landed on the subsea foundation and secured thereto, a remotely operated connecting tool is lowered downwards from the surface vessel and is operated to displace the spool piece hub into engagement with the pipeline hub, whereupon the connecting tool is operated to actuate a clamping device so as to clamp together the spool piece hub and the pipeline hub. The connecting tool is then retrieved to the surface vessel. This known connection arrangement and method require that the spool piece and the subsea foundation are installed on the seabed before the pipeline is laid out on the seabed and the pipeline end section provided with the pipeline hub has to be secured to the subsea foundation before the remaining part of the pipeline is laid out on the seabed. Consequently, this known connection arrangement and method are not appropriate for use when connecting a spool piece to a pipeline that has previously been laid on the seabed.

Another pipeline connection arrangement for subsea connection of a pipeline to a spool piece is previously known from U.S. Pat. No. 6,142,708 A. The pipeline hub is here secured to a landing platform, which is to be lowered onto the seabed from a surface vessel. The spool piece hub is secured to a connecting tool, which is lowered downwards onto the landing platform so as to come to rest thereon, whereupon the connecting tool is operated to displace the spool piece hub into engagement with the pipeline hub. The pipeline hub is secured to the rather complex and bulky landing platform before being lowered into the sea from a surface vessel. The lay ramp and other equipment of the pipe-laying vessel have to be adapted and dimensioned for enabling manipulation and lay out of the landing platform. This will raise the costs for the pipe-laying vessel and reduce the number of vessels available for the pipe-laying operation, which could cause high costs for performing the pipe-laying operation.

SUMMARY OF THE INVENTION

The object of the present invention is to make possible subsea connection of a pipeline to a spool piece, without requiring any complex and/or bulky equipment to be attached to the pipeline end section before it is descended into the sea from a surface vessel.

According to the invention, this object is achieved by a pipeline termination skid, a connection arrangement and a method.

The pipeline termination skid according to the invention is so designed that a pipeline end section may be mounted thereto subsea by lowering the pipeline end section into a seat of one or several holding devices of the pipeline termination skid and thereafter displacing the pipeline termination skid along the pipeline end section so that the respective seat is brought into engagement with an alignment element secured about the pipeline end section so as to thereby fix the pipeline end section axially and radially in relation to the pipeline termination skid. When the pipeline end section has been secured to the pipeline termination skid, a spool piece termination structure carrying the spool piece hub and a clamping device is connectable to the pipeline termination skid by being lowered into engagement therewith. After the receipt of the spool piece termination structure on the pipeline termination skid, the actual connection of the pipeline hub to the spool piece hub may be performed by displacing the clamping device and the pipeline termination skid in relation to each other so as to bring the pipeline hub and spool piece hub into contact with each other, whereupon the clamping device brought into position in the same operation is activated so as to clamp together the pipeline hub and the spool piece hub. The entire pipeline may be laid on the seabed before the measures of connecting the pipeline to the spool piece are initiated. With the solution according to the invention, no landing platform or similar structure has to be secured to the pipeline end section when it is descended from the pipe-laying vessel, which will facilitate the pipe-laying operation and allow the pipeline to be laid out by means of a conventional pipe-laying vessel with capabilities related to the pipeline size rather then to a bulky pipeline termination. Thus, the inventive solution will reduce the demands on the pipe-laying vessel with respect to its equipment and feasibility to handle sizable equipment integrated with the pipeline as compared to the prior art solutions where a landing platform or the similar is secured to the pipeline end section before it leaves the pipe-laying vessel.

According to a preferred embodiment of the pipeline termination skid according to the invention, the seat of the respective holding device is designed to be engageable with a rotationally symmetric alignment element secured about the pipeline end section, the seat having a shape allowing the seat to mate with said rotationally symmetric alignment element. Hereby, the seat of the respective holding device may receive the pipeline end section and engage with the corresponding alignment element of the pipeline end section irrespective of the roll angle of the pipeline end section. Consequently, the roll angle of the pipeline end section is of no importance during the installation of the pipeline on the seabed and during the subsequent operations for connecting the pipeline hub to the spool piece hub. Thus, the pipeline end section may be laid on the seabed with arbitrary roll angle, which will facilitate the pipe-laying operation.

According to a preferred embodiment of the connection arrangement according to the invention, the pipeline termination skid and the spool piece termination structure are provided with corresponding alignment members, which are designed to allow contact with each other when the clamping device and the pipeline termination skid are displaced in relation to each other for the purpose of alignment of the mating hubs. Hereby, the pipeline hub will automatically be sufficiently aligned with the spool piece hub to meet the closing capture range of the clamping device when the hubs (terminations) have been displaced into contact with each other.

According to another preferred embodiment of the connection arrangement according to the invention, one of the pipeline termination skid and spool piece termination structure is provided with at least one male-like alignment member, preferably in the form of a spear, which is designed to fit into a corresponding female-like alignment member, preferably in the form of a spear funnel, arranged on the other of said pipeline termination skid and spool piece termination structure. This will provide a co-axial alignment so as to allow the mutual alignment shoulder/seat arrangement of the hubs perform the final alignment and load transfer.

Further advantages as well as advantageous features of the pipeline termination skid, the connection arrangement and the method according to the present invention will appear from the following description and the dependent claims.

The invention also relates to a pipeline termination. The pipeline termination is designed to allow the pipeline end section to be mounted subsea to a pipeline termination skid according to the present invention.

According to a preferred embodiment of the pipeline termination according to the invention, the respective alignments element is rotationally symmetric. Hereby, the roll angle of the pipeline termination is of no importance during the installation of the pipeline on the seabed and during the subsequent operations for mounting the pipeline end section to the pipeline termination skid. Thus, the pipeline termination may be laid on the seabed with arbitrary roll angle, which will facilitate the pipe-laying operation.

BRIEF DESCRIPTION OF THE DRAWINGS

With reference to the appended drawings, a specific description of preferred embodiments of the invention cited as examples follows below.

In the drawings.

DETAILED DESCRIPTION OF PREFERRED EMBODIMENTS OF THE INVENTION

Figure 1:
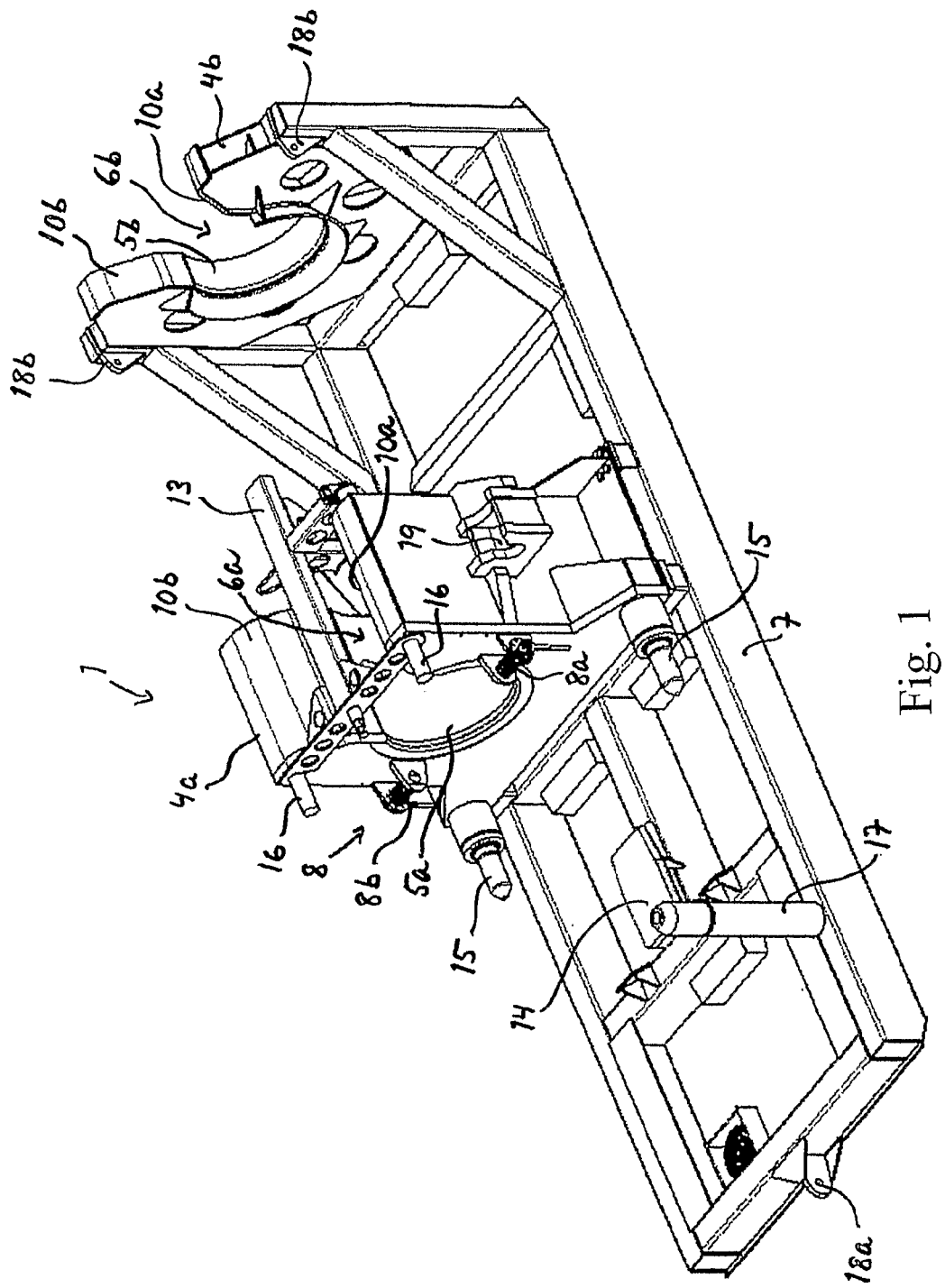
FIG. 1 is a perspective view of a pipeline termination skid according to the invention.

A pipeline termination skid 1 according to an embodiment of the present invention is shown in FIG. 1. The termination skid 1 is intended for use in subsea connection of a pipeline 2 to a spool piece. The termination skid 1 is to be mounted to a pipeline end section 2a so as to support a pipeline hub 2b during the connection of the pipeline hub to a corresponding spool piece hub. The termination skid 1 of FIG. 1 comprises two holding devices 4a, 4b for securing the pipeline end section 2a and the associated pipeline hub 2b to the termination skid in a predetermined orientation in relation to the termination skid. The respective holding device 4a, 4b is provided with a pipeline receiving seat 5a, 5b having an upwardly directed opening 6a, 6b. The pipeline end section 2a is insertable subsea through the respective opening 6a, 6b by being lowered in a direction essentially perpendicular to its own longitudinal axis so as to be received in said seats 5a, 5b. The seat 5a, 5b of the respective holding device 4a, 4b is designed to be engageable with an alignment element 2c, 2d secured about the pipeline end section 2a by displacement of the pipeline termination skid 1 in the longitudinal direction of a pipeline end section received in the seats 5a, 5b of the holding devices 4a, 4b so as to thereby fix the pipeline end section 2a axially and radially in relation to the holding devices 4a, 4b and thereby in relation to the pipeline termination skid 1. The termination skid 1 comprises a base frame 7, to which the holding devices 4a, 4b are attached. The base frame 7 is designed to allow the termination skid 1 to rest on the seabed, i.e. the termination skid 1 may be placed on the seabed with the base frame 7 resting thereon. The holding devices 4a, 4b are arranged on the upper side of the base frame 7 behind each other in such a way that their seats 5a, 5b are mutually aligned, i.e. in such a way that the centre axes of the seats are coinciding, so as to allow a pipeline end section 2a to extend rectilinearly through the seats 5a, 5b of both holding devices. In the illustrated embodiment, the base frame 7 is provided with a pull eye 18a so as to allow the termination skid 1 to be displaced by pulling when installed on the seabed, and a number of lifting lugs 18b to be used when lowering the termination skid 1 to the seabed.

Figure 6:
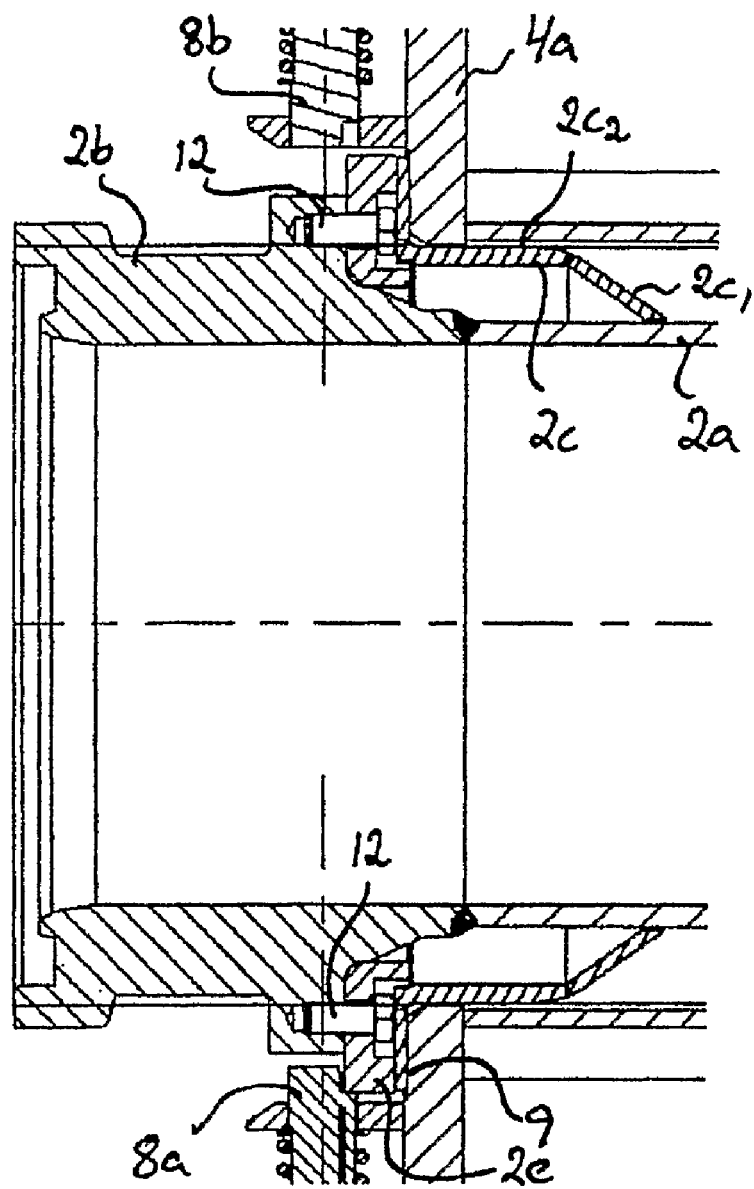
FIG. 6 is a cut planar view of a part of a holding device of the pipeline termination skid according to FIGS. 1-5 and a pipeline hub secured thereto.

The termination skid 1 is provided with locking means 8 for locking a pipeline end section axially in relation to the termination skid 1 when the seat 5a, 5b of the respective holding device 4a, 4b has come into fixating engagement with the corresponding alignment element 2c, 2d of the pipeline end section. In the illustrated embodiment, said locking means 8 comprises two displaceable locking members 8a, 8b arranged on the holding device 4a that is to engage with the alignment element 2c located closest to the pipeline hub 2b. This holding device 4a is in the following denominated "first holding device", whereas the other holding device 4b is denominated "second holding device". The locking members 8a, 8b are located on opposite sides of the seat 5a of the first holding device 4a and are spring-loaded in a direction towards the centre axis of the seat $5a$. The locking members $8a$, $8b$ are suitably designed to engage with a flange $2e$ (see FIG. 6) arranged on the pipeline end section fixedly secured in relation to the pipeline hub $2b$ so as to thereby lock the pipeline end section $2a$ and the pipeline hub $2b$ in relation to the first holding device $4a$ and thereby in relation to the termination skid 1 in a predetermined axial position. In the illustrated embodiment, the respective locking member $8a$, $8b$ is displaceable into and out of engagement with said flange $2e$. In FIG. 6, one $8a$ of the locking members is shown in the protruded locking position, in which position said flange $2e$ is locked in place between the locking member $8a$ and an abutment 9 of the first holding device $4a$, whereas the other locking member $8b$ is shown in the retracted position, in which position the locking member $8b$ is out of engagement with said flange $2e$.

The respective holding device $4a$, $4b$ is suitably provided with two opposed guiding surfaces $10a$, $10b$, which are connected to the upwardly directed opening $6a$, $6b$ of the seat $5a$, $5b$ of the holding device and which are inclined towards each other as seen in the direction downwards so as to assist the guiding of a pipeline end section $2a$ through said opening $6a$, $6b$ and into the seat $5a$, $5b$ of the holding device.

It is realized that the seat $5a$, $5b$ of the respective holding device $4a$, $4b$ should have an internal shape allowing the seat to mate with the corresponding alignment element $2c$, $2d$ of the pipeline end section when the seat is brought into engagement therewith upon the displacement of the termination skid 1 in relation to the pipeline end section $2a$. Thus, the respective seat $5a$, $5b$ should have a cross-sectional shape corresponding to the cross-sectional shape of the corresponding alignment element $2c$, $2d$. The seat $5a$, $5b$ of the respective holding device $4a$, $4b$ is preferably designed to be engageable with a rotationally symmetric alignment element $2c$, $2d$. The respective seat $5a$, $5b$ preferably has an essentially circular cross-sectional shape with an upwardly directed opening, as illustrated in FIGS. 1-5. It is realized that the width of the upwardly directed opening $6a$, $6b$ of the respective seat $5a$, $5b$ should be smaller than the diameter of the seat $5a$, $5b$ and smaller than the largest diameter of the associated alignment element $2c$, $2d$ but larger than the diameter of the pipeline 2. It is also realized that the diameter of the respective seat $5a$, $5b$ should be larger than the diameter of the pipeline 2. In the illustrated embodiment, the respective seat $5a$, $5b$ is formed as a recess in the associated holding device $4a$, $4b$.

A pipeline termination $2f$ according to the present invention is shown in FIGS. 2-6. The pipeline termination $2f$ is to be applied to the end section $2a$ of a pipeline 2 so as to allow the pipeline to be connected subsea to a pipeline termination skid 1. The pipeline termination $2f$ is designed for co-operation with a termination skid 1 according to the present invention. The pipeline termination $2f$ comprises a pipeline hub $2b$ designed for connection to a corresponding spool piece hub. The pipeline termination $2f$ further comprises a flange $2e$ located behind the pipeline hub $2b$ and designed to constitute a locking shoulder that is intended to co-operate with the locking means 8 of the termination skid 1 in order to fix the pipeline end section axially in relation to the termination skid. Said flange $2e$ is fixedly secured in relation to the pipeline hub $2b$ and is preferably rotationally symmetric. The pipeline termination further comprises a first alignment element $2c$ secured to the pipeline end section behind the pipeline hub $2b$ and designed to mate with the seat $5a$ of the first holding device $4a$ of the pipeline termination skid, and a second alignment element $2d$ secured to the pipeline end section behind the first alignment element $2c$ at a distance therefrom and designed to mate with the seat $5b$ of the second holding device $4b$ of the pipeline termination skid. In the illustrated embodiment, the respective alignment element $2c$, $2d$ is designed as a sleeve-shaped or ring-shaped element surrounding the pipeline end section. The respective alignment element $2c$, $2d$ is preferably rotationally symmetric. In the illustrated embodiment, the flange $2e$ is located between the pipeline hub $2b$ and the first alignment element $2c$. The flange $2e$ is suitably secured to the pipeline hub $2b$, for instance by bolts 12, as illustrated in FIG. 6. The flange $2e$ may alternatively be an integrated part of the pipeline hub $2b$. The respective alignment element $2c$, $2d$ is suitably provided with a cone-shaped surface $2c_1$, $2d_1$ at the end facing away from the pipeline hub $2b$ so as to facilitate the mutual engagement between the alignment element $2c$, $2d$ and the corresponding seat $5a$, $5b$ of the holding devices $4a$, $4b$. The cone-shaped surface $2c_1$, $2d_1$ of the respective alignment element is joined to a cylindrically shaped surface $2c_2$, $2d_2$ of the alignment element.

Figure 2:
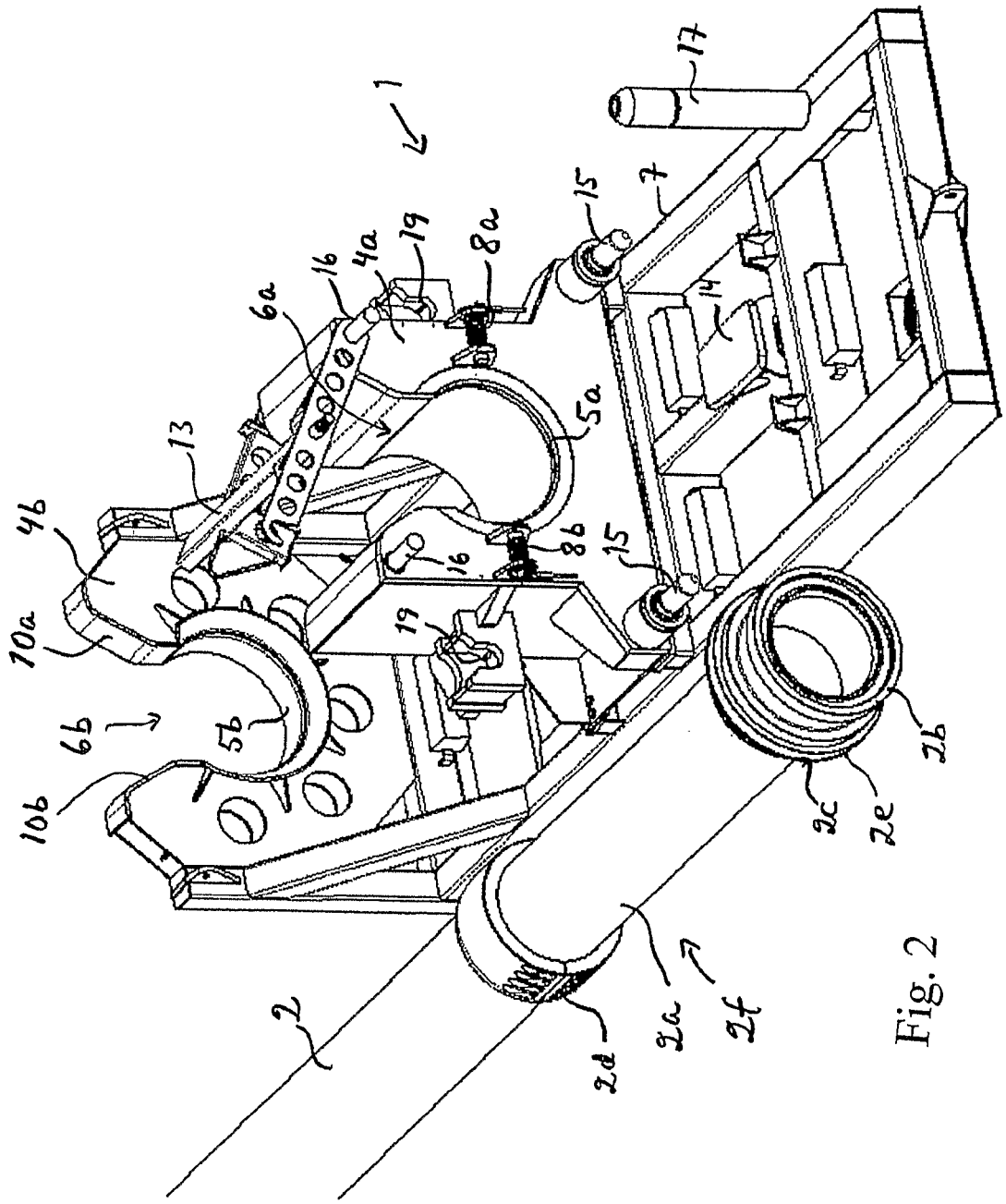
FIG. 2 is a perspective view of the pipeline termination skid according to FIG. 1 and a pipeline end section to be mounted to the pipeline termination skid.
Figure 3:
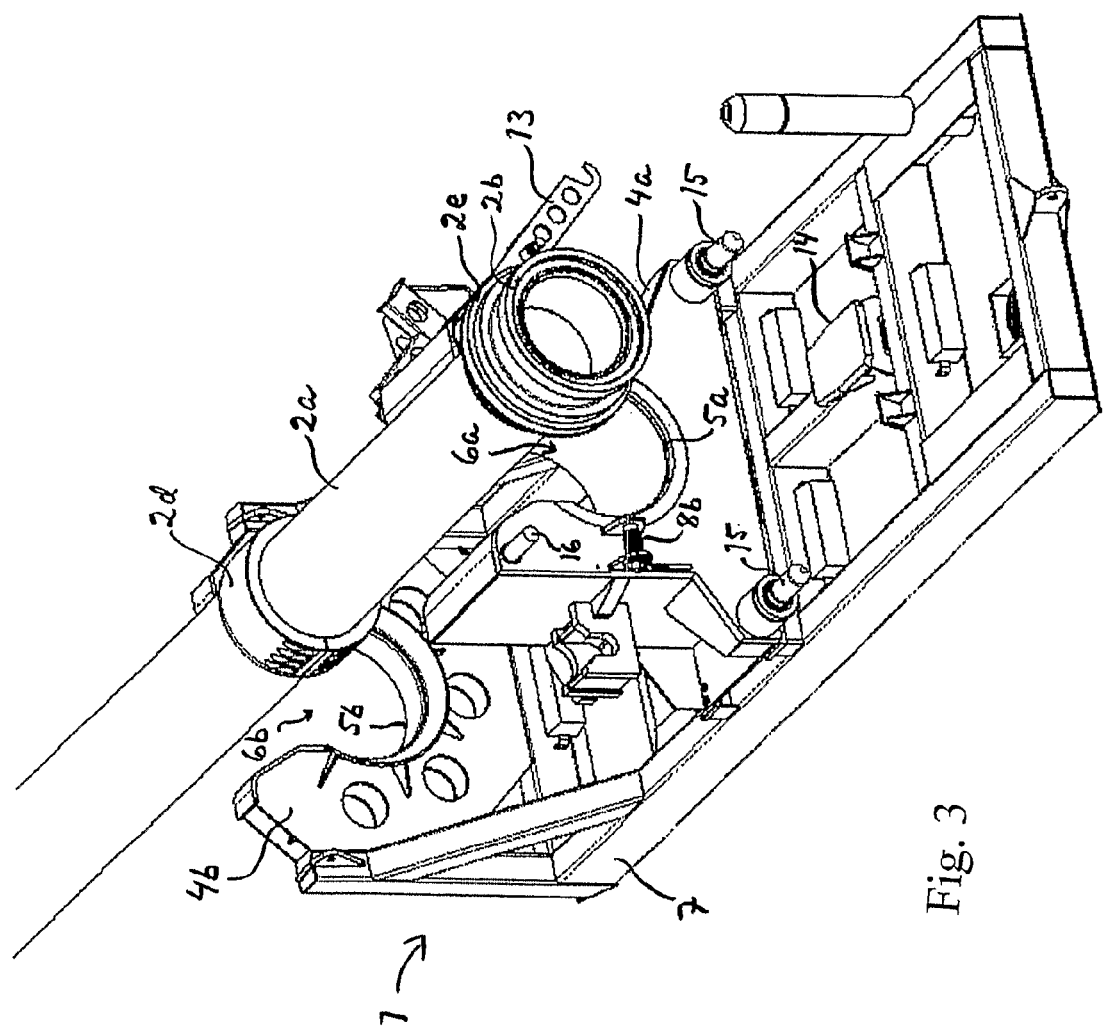
FIGS. 3-5 are perspective views of the pipeline termination skid and pipeline end section according to FIG. 2, as seen at different stages in the mounting of the pipeline end section to the pipeline termination skid.
Figure 4:
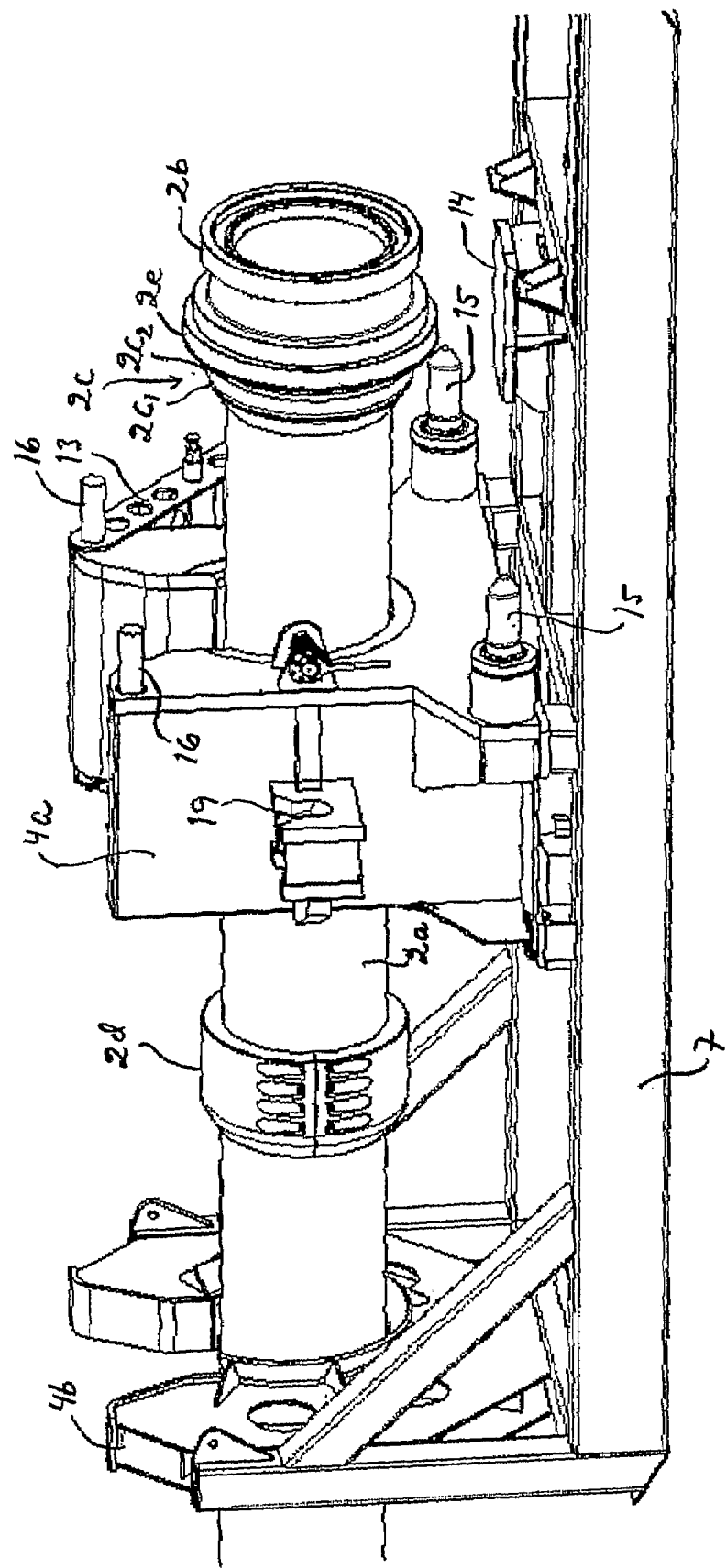
Figure 5:
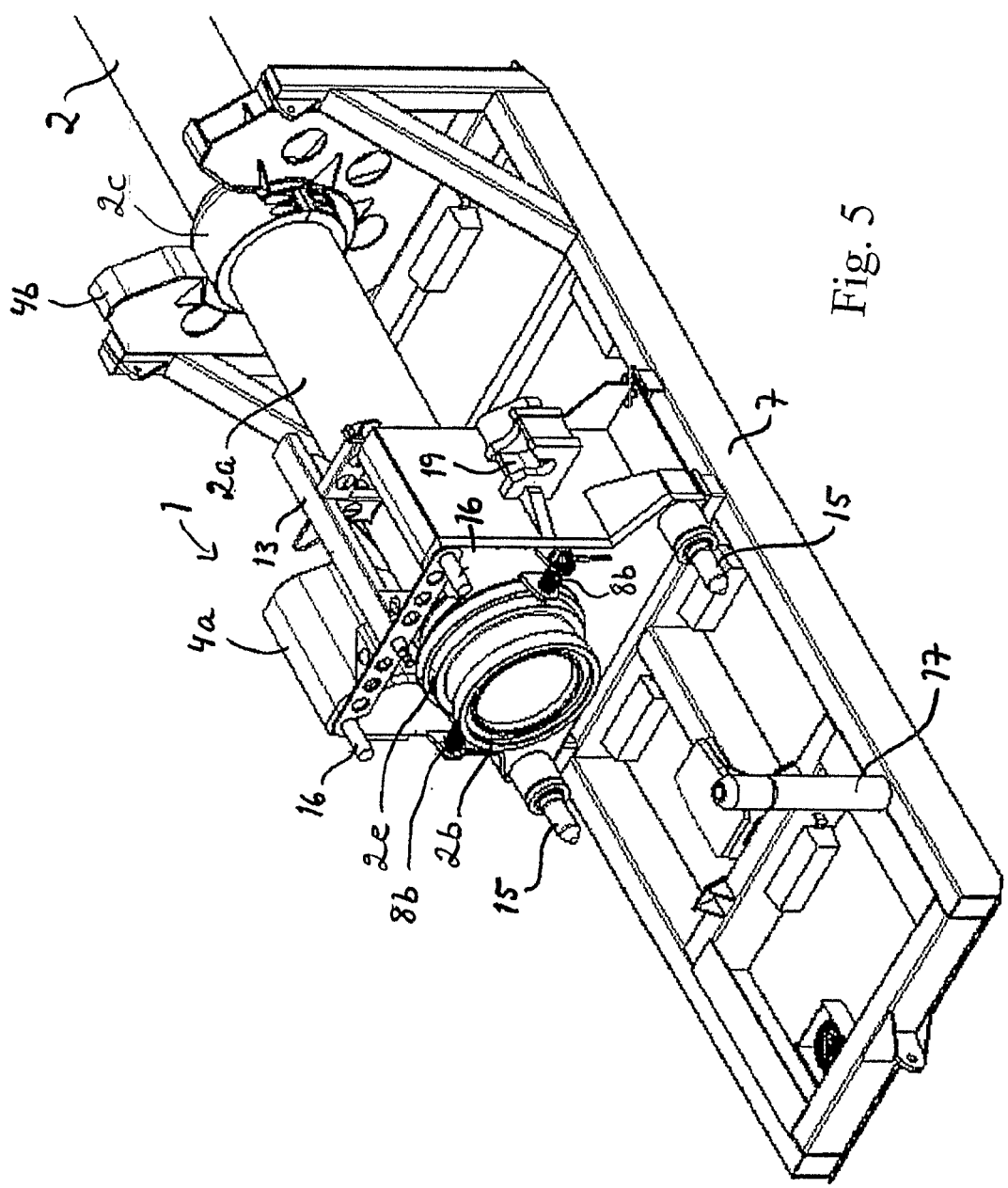

Different stages in the mounting of a pipeline 2 to a pipeline termination skid 1 according to the invention are illustrated in FIGS. 2-5. The pipeline 2 provided with a pipeline termination $2f$ of the above-indicated type is initially laid on the seabed. The termination skid 1 is lowered into the sea, e.g. from a surface vessel, and placed on the seabed adjacent and parallel to the pipeline end section $2a$ axially displaced with the seat $5b$ of the holding device $4b$ located in between section $2c$ and $2d$ of the pipeline end $2a$, as illustrated in FIG. 2. In this position, the first alignment element $2c$ and the pipeline hub $2b$ should be located in front of the first holding device $4a$, whereas the second alignment element $2d$ should be located between the first holding device $4a$ and the second holding device $4b$, as seen in the longitudinal direction of the pipeline end section $2a$. Thereafter, the pipeline end section $2a$ is lifted and moved laterally to a position vertically above the seats $5a$, $5b$, whereupon the pipeline end section is lowered downwards in a direction essentially perpendicular to its own longitudinal axis through the opening $6a$, $6b$ of the respective holding device (see FIG. 3) so as to be received in the seats $5a$, $5b$. In this position (see FIG. 4), the first alignment element $2c$ is located in front of the first holding device $4a$, whereas the second alignment element $2d$ is located between the holding devices $4a$, $4b$. In order to fix the pipeline end section $2a$ axially and radially in relation to the termination skid 1, the termination skid is displaced in relation to the pipeline end section $2a$ from the position illustrated in FIG. 4 to the position illustrated in FIG. 5. The termination skid 1 is preferably displaced by being pulled. Alternatively, a hydraulic tool arrangement may be designed to perform the required axial displacement. The termination skid 1 is displaced in the longitudinal direction of the pipeline end section $2a$ so that the seat $5a$ of the first holding device will engage with the first alignment element $2c$ and the seat $5b$ of the second holding device will engage with the second alignment element $2d$. The respective alignment element $2c$, $2d$ is designed to mate with the corresponding seat $5a$, $5b$ in such a manner that the alignment element is locked in radial direction in relation to the associated holding device $4a$, $4b$. The termination skid 1 is displaced along the pipeline end section $2a$ until the flange $2e$ abuts against the corresponding abutment 9 of the first holding device $4a$, as illustrated in FIGS. 5 and 6. The locking members $8a$, $8b$ of the locking means 8 are then actuated so as to lock the flange $2e$ in place between the respective locking member $8a$, $8b$ and the abutment 9.

In the illustrated embodiment, the termination skid 1 is provided with a landing platform 13. This landing platform 13 is so designed that a ROV may be landed thereon in connection with maintenance and inspection. The landing platform 13 is here pivotally connected to the first holding device 4a so as to allow the landing platform to be pivoted away from the space above the opening 6a of the seat 5a in connection with the mounting of a pipeline end section 2a to the termination skid 1.

Figure 7:
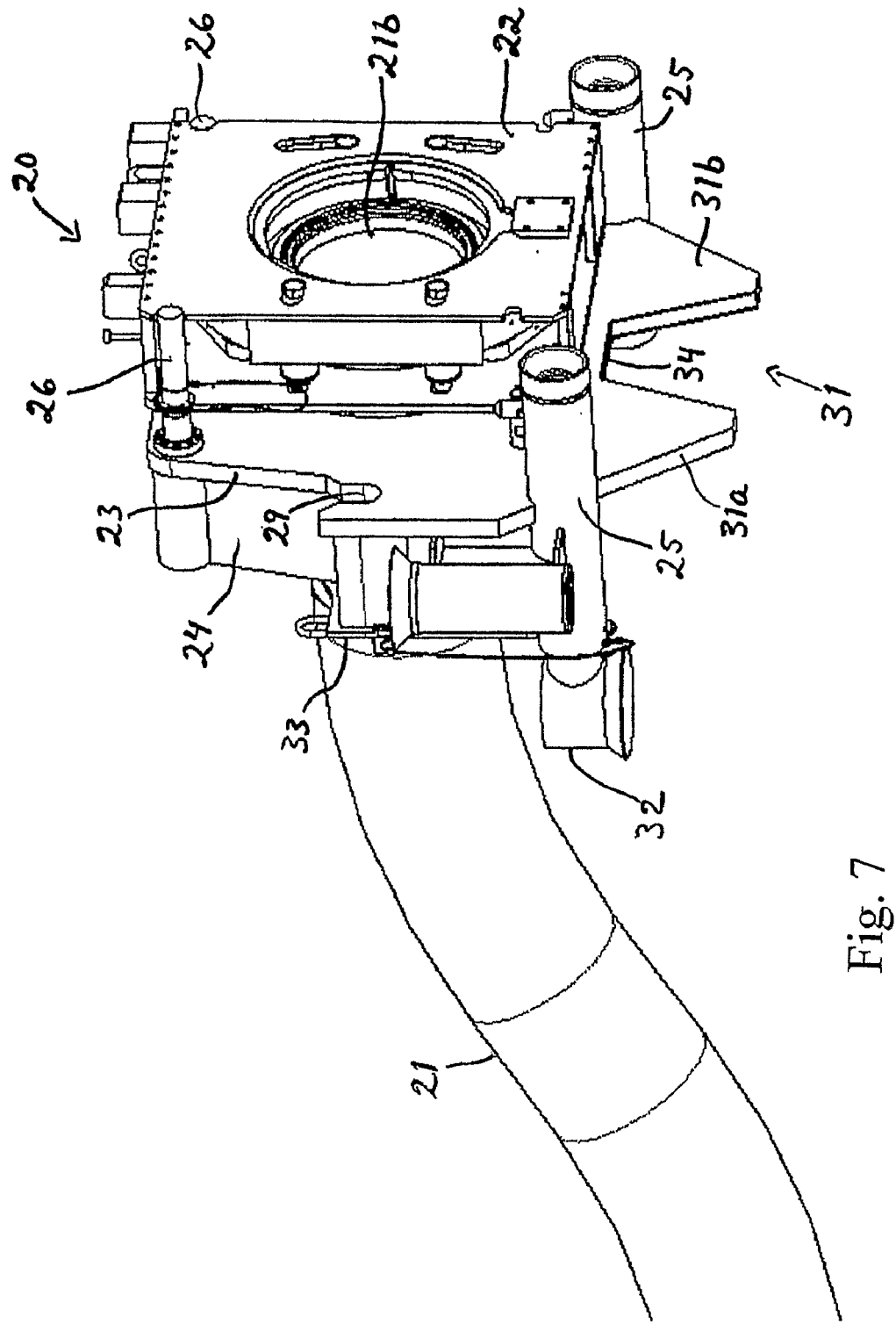
FIG. 7 is a perspective view of a spool piece termination structure intended for co-operation with the pipeline termination skid according to FIGS. 1-5, and FIGS. 8-10 are perspective views of the pipeline termination skid according to FIGS. 1-5 and the spool piece termination structure according to FIG. 7, as seen at different stages in the connection of a pipeline to a spool piece.

The termination skid 1 illustrated in FIGS. 1-6 is intended to co-operate with spool piece termination structure 20 that is to be mounted to a spool piece 21 so as to support a spool piece hub 21b during the connection of the spool piece hub 21b to a corresponding pipeline hub 2b. An embodiment of such a spool piece termination structure 20 is illustrated in FIG. 7. The spool piece termination structure 20 comprises a clamping device 22 for clamping together a pipeline hub 2b and a corresponding spool piece hub 21b. The spool piece hub 21b and the associated spool piece 21 are to be mounted to the spool piece termination structure 20 before being lowered into the sea from a surface vessel. Thus, the spool piece hub and the spool piece are mounted to the termination structure before the performance of a connecting operation. In the illustrated embodiment, the clamping device 22 is attached to a vertical base plate 23 forming part of the base frame 24 of the termination structure. The spool piece 21 is also secured to this vertical base plate 23. The spool piece termination structure 20 is designed to be connectable to the pipeline termination skid 1 by being lowered downwards onto the pipeline termination skid so as to come to bear against it. The pipeline termination skid 1 and clamping device 22 are designed to be displaceable in relation to each other when the spool piece termination structure 20 has come to bear against the pipeline termination skid 1 so as to allow the clamping device 22 and a pipeline hub 2b secured to the pipeline termination skid 1 to be mutually displaced towards each other in order to bring the hubs 2b, 21b into contact with each other. This will be more closely described below with reference to FIGS. 8-10.

The spool piece termination structure 20 illustrated in FIG. 7 is provided with guiding devices 31, 32 designed to engage with the pipeline termination skid 1 when the spool piece termination structure 20 is lowered into engagement with the pipeline termination skid so as to secure that the spool piece termination structure 20 is properly received and positioned on the pipeline termination skid 1. The spool piece termination structure 20 is here provided with a first guiding device 31 comprising two tapered guiding members 31a, 31b protruding downwardly from the base frame 24 of the spool piece termination structure 20 and designed to engage with the base frame 7 of the pipeline termination skid 1. An abutment 34 located between the guiding members 31a, 31b is designed to abut against a plate-shaped seat 14 arranged on the base frame 7 of the pipeline termination skid 1. In the illustrated embodiment, the spool piece termination structure 20 is further provided with a second guiding device 32 in the form of a guide funnel, which is designed to engage with a corresponding guide post 17 arranged on the base frame 7 of the pipeline termination skid 1. In order to allow the base frame 24 of the spool piece termination structure 20 and thereby the clamping device 22 and the spool piece hub 21b to be displaced along the pipeline termination skid 1 towards a pipeline hub 2b mounted to the termination skid 1, the guide funnel 32 is slidably connected to the base frame 24 of the spool piece termination structure 20. The guide funnel 32 is releasably locked in place in relation to the base frame 24 of the termination structure 20 by means of a locking member 33, for instance in the form of a locking pin.

The pipeline termination skid 1 and the spool piece termination structure 20 are provided with corresponding alignment members 15, 25 which are designed to come into contact with each other when the base frame 24 of the termination structure 20 is displaced towards a pipeline hub 2b secured to the pipeline termination skid 1 so as to properly align the pipeline hub 2b in relation to the spool piece hub 21b. One of the pipeline termination skid 1 and spool piece termination structure 20 is suitably provided with at least one male-like alignment member 15, preferably in the form of a spear, which is designed to fit into a corresponding female-like alignment member 25, preferably in the form of a spear funnel, arranged on the other of said termination skid 1 and termination structure 20. In the illustrated embodiment, the pipeline termination skid 1 is provided with two alignment spears 15 arranged in the termination skid 1 so as to be located below and on either side of the centre line of a pipeline end section 2a mounted to the termination skid 1. The spool piece termination structure 20 is here provided with two spear funnels 25 for receiving a respective one of the alignment spears 15. The spear funnels 25 are located on either side of the centre line of a spool piece hub 21b mounted to the termination structure 20. The respective alignment member 15 of the pipeline termination skid 1 is preferably designed to abut against the corresponding alignment member 25 of the spool piece termination structure 20 when the spool piece hub 21b has been displaced into contact with the pipeline hub 2b so as to align the hub mating faces prior to their mutual contact for final alignment.

The pipeline termination skid 1 is preferably also provided with at least two stop members 16, which are arranged in the termination skid so as to be located above and on either side of the centre line of a pipeline end section 2a mounted to the termination skid. The respective stop member 16 is designed to abut against a corresponding stop member 26 of the spool piece termination structure 20 when the spool piece hub 21b is displaced into contact with the pipeline hub 2b so as to reduce the angle between the hub mating faces. Hereby, the pipeline hub 2b will automatically be sufficiently aligned with the spool piece hub 21b to meet the closing capture range of the clamping device. In the illustrated embodiment, the pipeline termination skid 1 and the spool piece termination structure 20 are each provided with two such stop members 16, 26 in addition to the corresponding function included in the alignment members 15, 25.

The spool piece termination structure 20 and/or the pipeline termination skid 1 are/is provided with means for receiving a remotely operated connecting tool, not shown, provided with force applying means, preferably in the form of hydraulic cylinders, for displacing the clamping device 22 and the spool piece hub 21b in relation to the termination skid 1. The clamping device 22 and the spool piece hub 21b are preferably designed to be displaced in relation to the termination skid 1 by being displaced together with the base frame 24 of the spool piece termination structure 20 in relation to the termination skid. In the illustrated embodiment, the pipeline termination skid 1 and spool piece termination structure 20 are each provided with slots 19, 29 for docketing of hydraulic cylinders of the connecting tool to said structures. The connecting tool is also provided with force applying means, preferably hydraulically operated, for actuating the clamping device 22 so as to clamp together the pipeline hub 2b and the spool piece hub 21b. The connecting tool is preferably designed as a separate unit that is lowered downwards into engagement with the pipeline termination skid 1 and the spool piece termination structure 20 after the positioning of the termination structure onto the termination skid.

In the illustrated embodiment, the spool piece termination structure 20 is provided with guiding means 30 designed to co-operate with corresponding guiding means on the connecting tool so as to guide the connecting tool into a correct position in relation to the termination structure 20 when the connecting tool is lowered downwards into engagement with the termination structure. In the illustrated embodiment, said guiding means of the termination structure 20 comprises two guide post receptacles 30 arranged in the termination structure 20 so as to be located on either side of the spool piece 21. The respective guide post receptacle 30 is intended to receive a guide post, by means of which the connecting tool is guided into engagement with the termination structure 20. An alternative guiding system may be provided.

Figure 8:
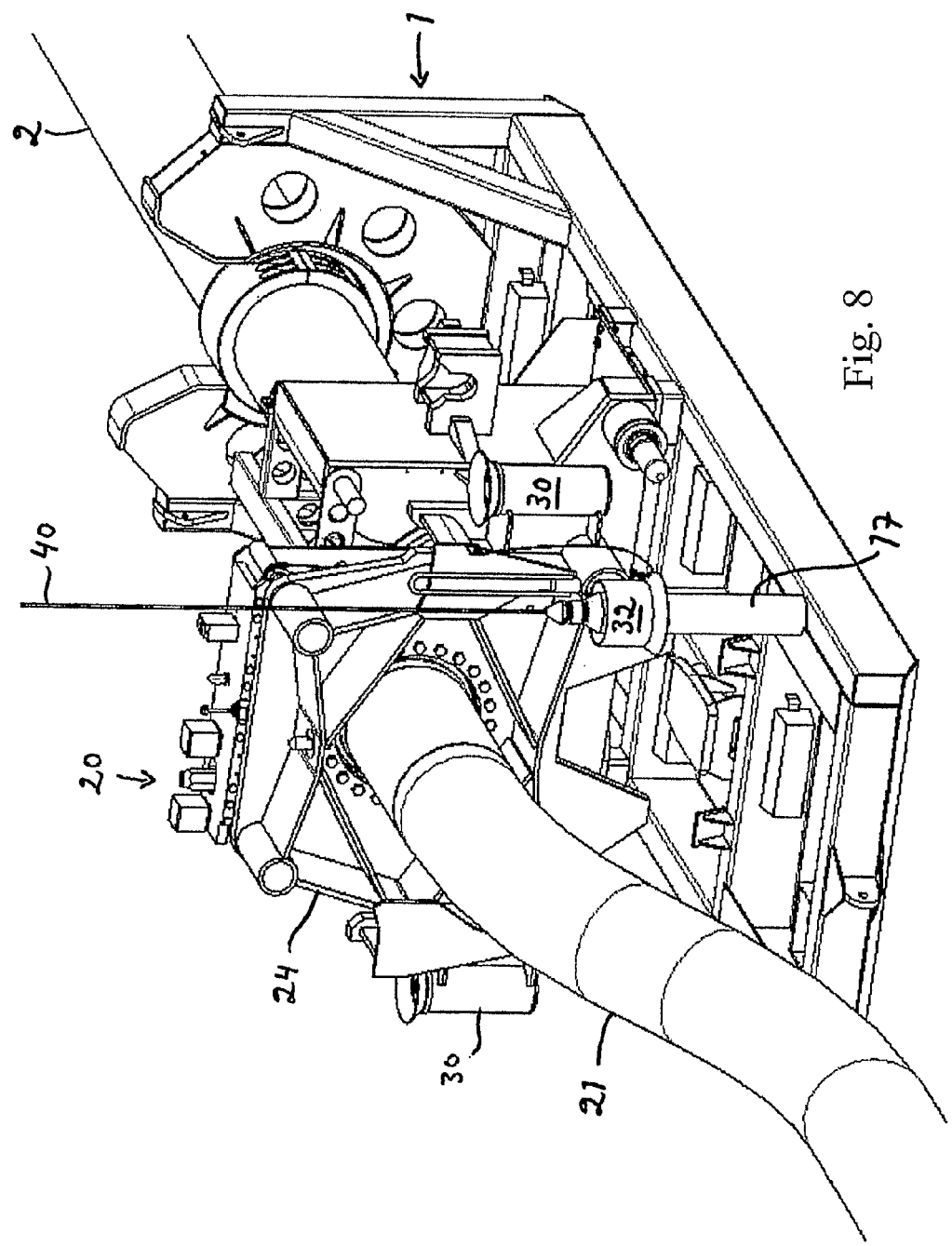
Figure 9:
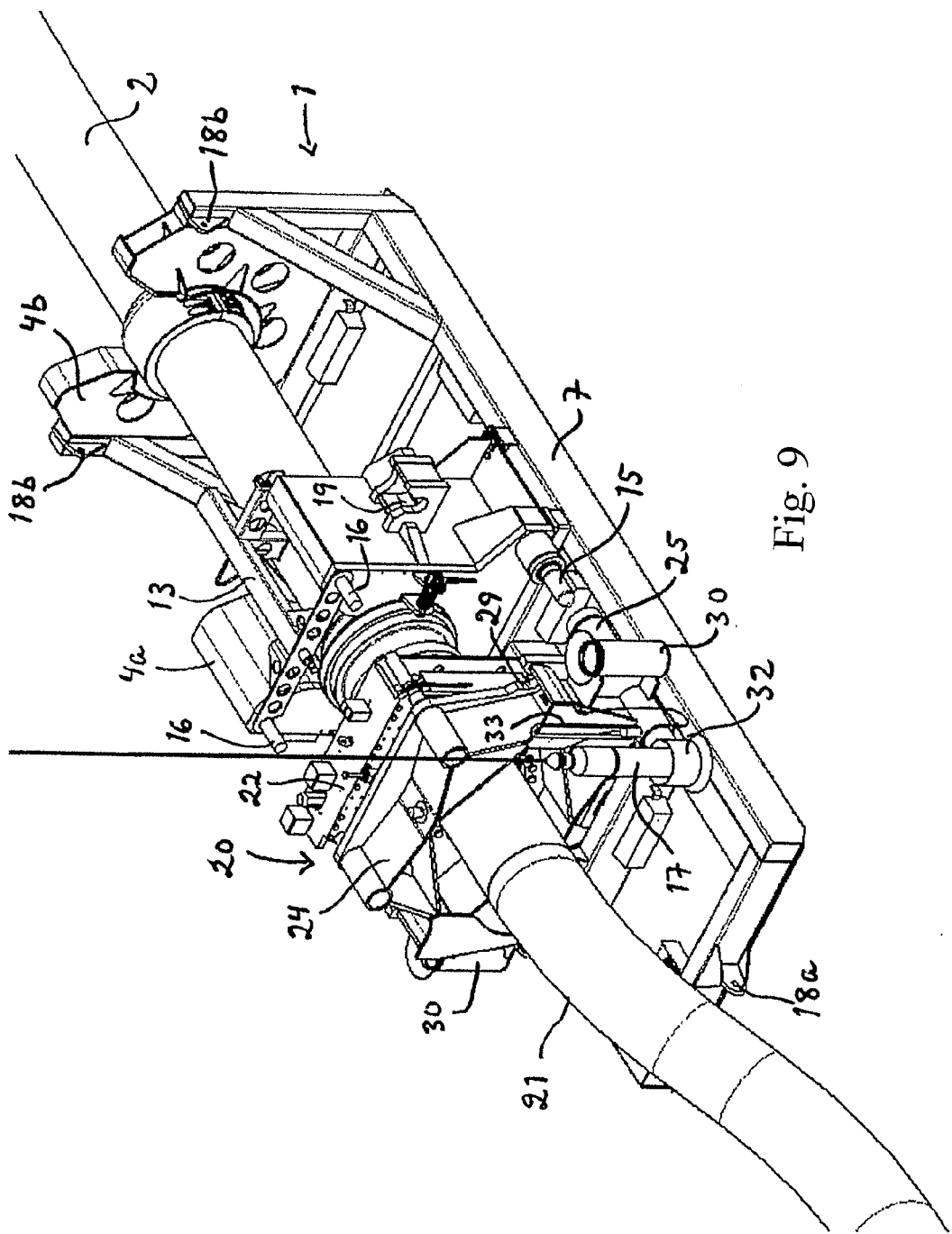
Figure 10:
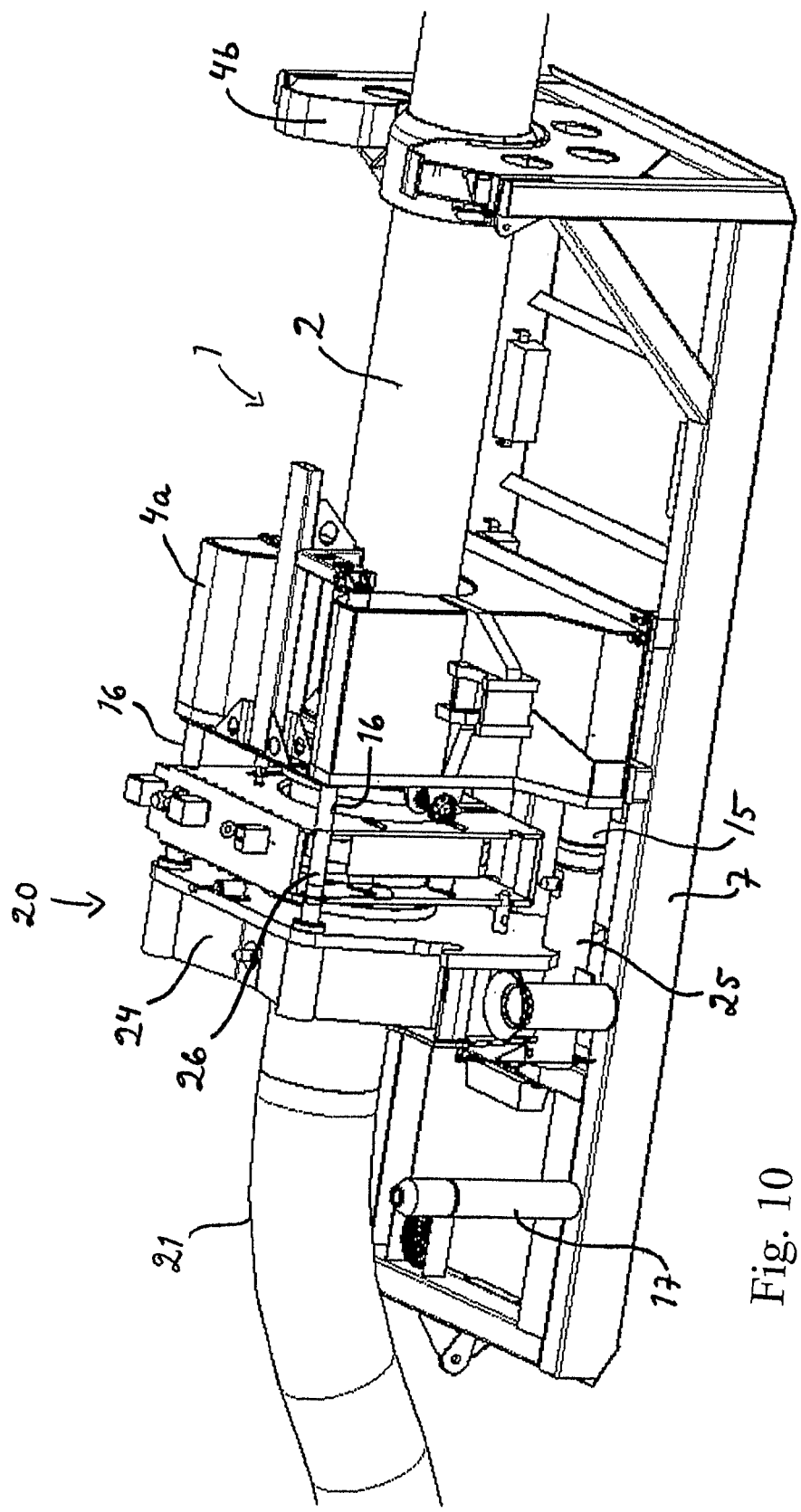

The operation of a connection arrangement comprising a spool piece termination structure 20 according to FIG. 7 and a pipeline termination skid 1 according to FIGS. 1-6 is schematically illustrated in FIGS. 8-10. The pipeline 2 is first mounted to the pipeline termination skid 1 in the manner described above with reference to FIGS. 2-5. Subsea metrology may then be carried out between the pipeline hub 2b and the permanent subsea installation to which the pipeline is to be connected. The results of the subsea metrology are used to complete the geometry of the spool piece 21, which is mounted to the spool piece termination structure 20. The termination structure 20 is together with the associated spool piece 21 lowered into the sea, e.g. by means of slings attached to the spool piece from a surface vessel, and it is lowered downwards onto the pipeline termination skid 1 so as to come to bear against the base frame 7 thereof. A guide line 40 attached to the guide post 17 of the pipeline termination skid 1 will assist the guiding to ensure capture of the guide funnel 32 of the spool piece termination structure 20 over the guide post 17, as illustrated in FIG. 8. In FIG. 9, the spool piece termination structure 20 is shown when received on the base frame 7 of the pipeline termination skid 1. A connecting tool, not shown, comprising a pair of stroking cylinders is then lowered downwards into contact with the spool piece termination structure 20 and the pipeline termination skid 1. The connecting tool may be guided into position by means of guide posts, not shown, inserted into the guide post receptacles 30 of the termination structure 20. The stroking cylinders are connected to the spool piece termination structure 20 and the pipeline termination skid 1 via the docketing slots 29, 19 arranged therein. The stroking cylinders are then actuated so as to displace the base frame 24 of the spool piece termination structure 20 and thereby the clamping device 22 and the spool piece hub 21b towards the pipeline hub 2b mounted to the pipeline termination skid 1. Before the actuation of the stroking cylinders, the locking member 33 is disengaged so as to allow the base frame 24 of the spool piece termination structure 20 to be displaced in relation to the guide funnel 32. When the displacement operation is completed, a torque applying device, not shown, is made to actuate the clamping device 22 so as to clamp together the pipeline hub 2b and the spool piece hub 21b, whereupon a pressure test is performed to verify the sealing integrity. The connecting tool is then retrieved to the surface. FIG. 10 shows the connection arrangement after the completed connection of the pipeline hub to the spool piece hub. The spool piece is omitted in FIGS. 9 and 10.

The torque applying device may be included in the connecting tool or constitute a separate unit that is moveable into contact with the spool piece termination structure separately from the connecting tool.

The invention is of course not in any way restricted to the preferred embodiments described above. On the contrary, many possibilities to modifications thereof will be apparent to a person with ordinary skill in the art without departing from the basic idea of the invention such as defined in the appended claims.

The invention claimed is:

1. A pipeline termination skid to be mounted to a pipeline end section so as to support a pipeline hub during the connection of the pipeline hub to a corresponding spool piece hub, the pipeline termination skid comprising
    one or several holding devices for securing the pipeline end section and the associated pipeline hub to the pipeline termination skid in a predetermined orientation in relation to the pipeline termination skid, wherein
    the respective holding device is provided with a seat having an upwardly directed opening through which the pipeline end section is insertable subsea by being lowered in a direction essentially perpendicular to its own longitudinal axis so as to be received in the seat, and
    the seat of the respective holding device is designed to be engageable with an alignment element secured about the pipeline end section by displacement of the pipeline termination skid in relation to a pipeline end section received in the seat of the respective holding device in the longitudinal direction of said pipeline end section so as to thereby fix the pipeline end section axially and radially in relation to the pipeline termination skid.

2. The pipeline termination skid according to claim 1, further comprising:
    locking means for locking a pipeline end section axially in relation to the pipeline termination skid when the seat of the respective holding device has come into fixating engagement with the corresponding alignment element of the pipeline end section.

3. The pipeline termination skid according to claim 2, wherein said locking means are arranged on a holding device.

4. The pipeline termination skid according to claim 1, wherein the pipeline termination skid comprises at least two holding devices having mutually aligned seats.

5. The pipeline termination skid according to claim 1, wherein the width of the upwardly directed opening of the respective seat is smaller than the diameter of the seat.

6. The pipeline termination skid according to claim 1, wherein the respective holding device is provided with two opposed guiding surfaces, which are connected to the upwardly directed opening of the seat of the holding device and which are inclined towards each other as seen in the direction downwards so as to assist the guiding of a pipeline end section through said opening and into the seat of the holding device.

7. The pipeline termination skid according to claim 1, further comprising:
    a base frame to which the respective holding device is attached, said base frame being designed to allow the pipeline termination skid to rest on the seabed.

8. The pipeline termination skid according to claim 1, wherein the seat of the respective holding device is designed to be engageable with a rotationally symmetric alignment element secured about the pipeline end section, the seat having a shape allowing the seat to mate with said rotationally symmetric alignment element.

9. A connection arrangement for subsea connection of a pipeline to a spool piece by clamping together a pipeline hub secured to an end section of the pipeline and a spool piece hub secured to an end section of the spool piece, the connection arrangement comprising:
    a pipeline termination skid according to claim 1,
    a spool piece termination structure to be mounted to a spool piece so as to support a spool piece hub during the connection of the spool piece hub to a corresponding pipeline hub, the spool piece termination structure comprising a clamping device for clamping together said spool piece hub and pipeline hub, wherein the spool piece termination structure is designed to be connectable to the pipeline termination skid by being lowered downwards onto the pipeline termination skid so as to come to bear against it, and wherein the pipeline termination skid and clamping device are designed to be displaceable in relation to each other when the spool piece termination structure has come to bear against the pipeline termination skid so as to allow the clamping device and the spool piece hub of a spool piece secured to the spool piece termination structure to be displaced towards the pipeline hub of a pipeline end section secured to the pipeline termination skid in order to bring said hubs into contact with each other.

10. The connection arrangement according to claim 9, wherein the pipeline termination skid and the spool piece termination structure comprise corresponding alignment members, which are designed to allow contact with each other when the clamping device and the pipeline termination skid are displaced in relation to each other for the purpose of alignment of the said hubs.

11. The connection arrangement according to claim 10, wherein one of the pipeline termination skid and spool piece termination structure comprises at least one male-like alignment member which is designed to fit into a corresponding female-like alignment member arranged on the other of said pipeline termination skid and spool piece termination structure.

12. The connection arrangement according to claim 11, wherein the at least one male-like alignment member comprises a spear.

13. The connection arrangement according to claim 11, wherein the female-like alignment member comprises a spear funnel.

14. The connection arrangement according to claim 10, wherein the pipeline termination skid comprises at least two alignment members, which are arranged in the pipeline termination skid so as to be located below and on either side of the centre line of a pipeline end section secured to the pipeline termination skid.

15. The connection arrangement according to claim 10, wherein the respective alignment member of the pipeline termination skid is designed to abut against the corresponding alignment member of the spool piece termination structure when the spool piece hub is displaced into contact with the pipeline hub so as to align the hub mating faces prior to their mutual contact for final alignment.

16. The connection arrangement according to claim 10, wherein the pipeline termination skid comprises at least two stop members, which are arranged in the pipeline termination skid so as to be located above and on either side of the centre line of a pipeline end section secured to the pipeline termination skid, the respective stop member being designed to abut against a corresponding stop member of the spool piece termination structure when the spool piece hub is displaced into contact with the pipeline hub so as to align the hub mating faces prior to their mutual contact for final alignment.

17. The connection arrangement according to claim 9, wherein the spool piece termination structure and/or the pipeline termination skid are/is designed to receive a remotely operated connecting tool provided with force applying means for displacing the clamping device and the pipeline termination skid in relation to each other.

18. The connection arrangement according to claim 17, wherein the spool piece termination structure is provided with guiding means designed to co-operate with corresponding guiding means on the connecting tool so as to guide the connecting tool into a correct position in relation to the spool piece termination structure when the connecting tool is lowered downwards into contact with the spool piece termination structure.

19. The connection arrangement according to claim 9, wherein the spool piece termination structure comprises a base frame to which the clamping device is attached, and wherein the clamping device is displaceable in relation to the pipeline termination skid by being displaceable together with the base frame of the spool piece termination structure in relation to the pipeline termination skid.

20. A method for subsea connection of a pipeline to a spool piece by clamping together a pipeline hub secured to an end section of the pipeline and a spool piece hub secured to an end section of the spool piece, the method comprising:

securing the pipeline end section to a pipeline termination skid according to claim 1 by lowering the pipeline end section in a direction essentially perpendicular to its own longitudinal axis into the seat of the respective holding device and thereafter displacing the pipeline termination skid in relation to the pipeline end section in the longitudinal direction thereof so that the seat of the respective holding device is brought into engagement with an alignment element secured about the pipeline end section so as to thereby fix the pipeline end section axially and radially in relation to the pipeline termination skid, connecting a spool piece termination structure, to which the spool piece hub is mounted and which comprises a clamping device, to the pipeline termination skid by being lowered downwards onto the pipeline termination skid so as to come to bear against it, displacing the clamping device and the pipeline termination skid in relation to each other so as to bring the spool piece hub and the pipeline hub into contact with each other, and activating the clamping device so as to clamp together the pipeline hub and the spool piece hub.

21. The method according to claim 20, further comprising:
bringing the seat of the respective holding device of the pipeline termination skid into engagement with a rotationally symmetric alignment element secured about the pipeline end section by the displacement of the pipeline termination skid in the longitudinal direction of the pipeline end section.

22. The method according to claim 20, further comprising:
bringing corresponding alignment members of the spool piece termination structure and pipeline termination skid into contact with each other when the clamping device and the pipeline termination skid are displaced in relation to each other so as to properly align the pipeline hub in relation to the spool piece hub.

23. The method according to claim 20, further comprising:
displacing the clamping device and the pipeline termination skid in relation to each other by means of a remotely operated connecting tool provided with force applying means for displacing the clamping device and the pipeline termination skid in relation to each other.

24. The method according to claim 20, further comprising:
attaching the clamping device to a base frame of the spool piece termination structure, and
bringing the pipeline hub and the spool piece hub into contact with each other by displacing the base frame of the spool piece termination structure in relation to the pipeline termination skid.

25. A pipeline termination to be applied to the end section of a pipeline so as to allow the pipeline to be connected subsea to a pipeline termination skid according to claim 1, the pipeline termination comprising:
- a pipeline hub designed for connection to a corresponding spool piece hub,
- a first alignment element secured to the pipeline end section behind the pipeline hub and designed to mate with a seat of a first holding device of the pipeline termination skid, and
- a second alignment element secured to the pipeline end section behind the first alignment element at a distance therefrom and designed to mate with a seat of a second holding device of the pipeline termination skid.

26. The pipeline termination according to claim 25, wherein the respective alignment element is rotationally symmetric.

27. The pipeline termination according to claim 25, further comprising:
- a flange secured to the pipeline end section, which flange is designed to cooperate with locking means of the pipeline termination skid so as to fix the pipeline end section axially in relation to the pipeline termination skid.

28. The pipeline termination according to claim 27, wherein said flange is an integrated section of the pipeline hub.

* * * * *